May 15, 1962 P. K. BALTZER 3,034,987

MAGNETIC CORES

Filed Dec. 31, 1957 3 Sheets-Sheet 1

INVENTOR.

PHILIP K. BALTZER

BY J. L. Whittaker

ATTORNEY

INVENTOR.
PHILIP K. BALTZER
BY J L Whittaker
ATTORNEY

PROPERTIES OF THE SYSTEM $Li_{0.5}Fe_{2.0}Mn_{2.5y}Al_{2.5(0.2-y)}O_4$

INVENTOR.
PHILIP K. BALTZER
BY J L Whittaker
ATTORNEY

United States Patent Office
3,034,987
Patented May 15, 1962

3,034,987
MAGNETIC CORES

Philip K. Baltzer, Princeton, N.J., assignor to Radio Corporation of America, a corporation of Delaware Filed Dec. 31, 1957, Ser. No. 706,367
13 Claims. (Cl. 252—62.5)

Figures 1, 2, 3:
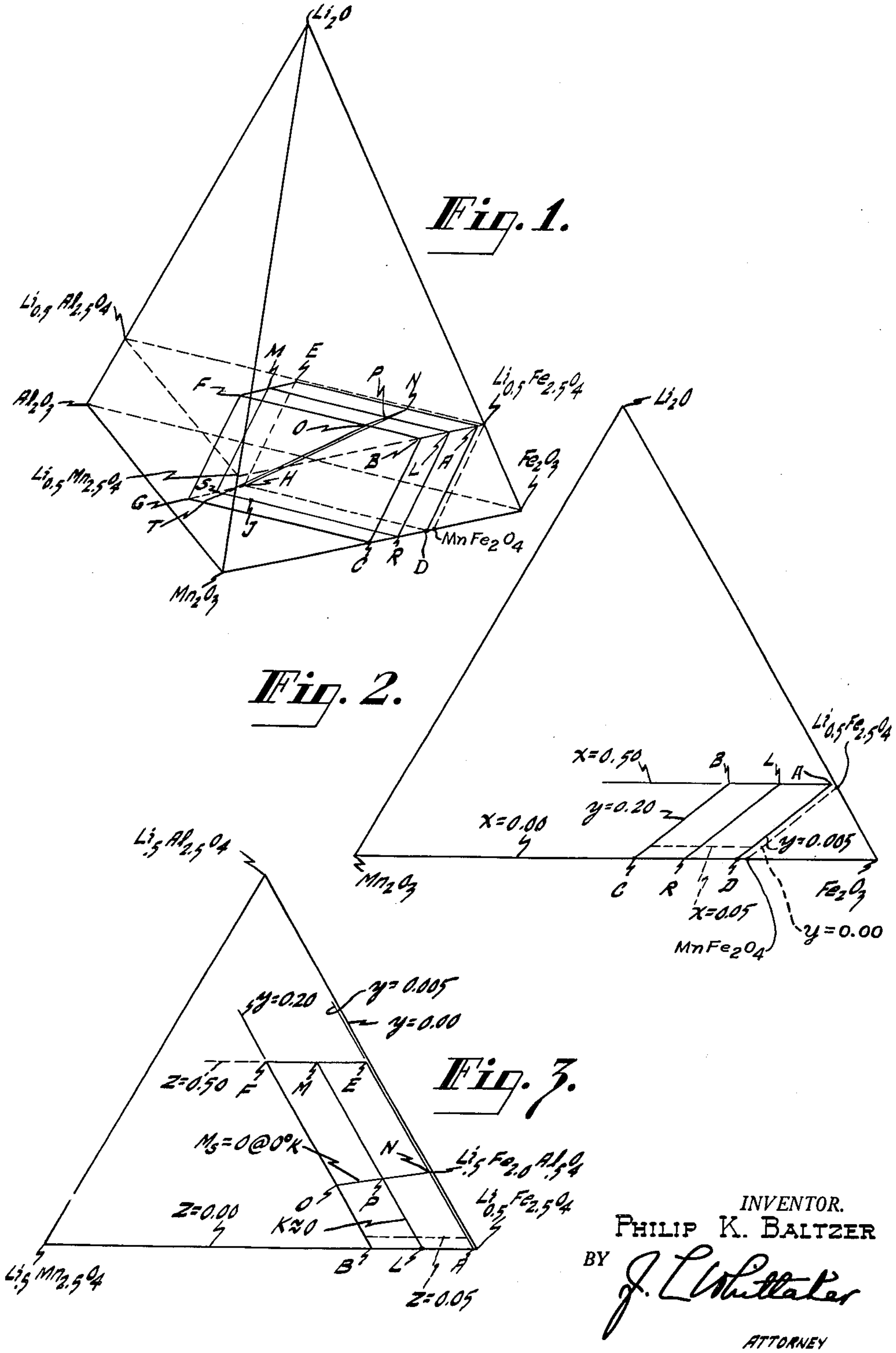

This invention relates to improved magnetic cores and particularly, but not necessarily exclusively, to ceramic bodies of sintered metallic oxides having unexpected and useful magnetic properties and to methods of manufacture thereof.

The term "spinel" generally refers to a class of materials having the molar formula $M^{2+}(M^{3+})_2O_4$ and having a spinel crystal structure. $M^{2+}$ may be one or more divalent cations. $M^{3+}$ may be one or more trivalent cations. A "single spinel" is a spinel in which $M^{2+}$ is a single divalent cation and $M^{3+}$ is a single trivalent cation. A "mixed spinel" is a spinel in which either or both $M^{2+}$ comprises more than one divalent cation or $M^{3+}$ comprises more than one trivalent cation. A "mixed spinel" may also be defined as a single homogeneous material comprising two or more single spinels in a solid solution. The spinels which exhibit ferromagnetic properties are referred to as "ferrospinels." The term "ferrite" is generally used to refer to a ceramic of sintered ferrospinel crystallites. The term "ferrites," however, includes also bodies or cores consisting essentially of crystallites other than spinels.

Magnetic cores consisting essentially of sintered spinel crystallites are useful in many electronic devices. For devices useful for processing and storage of information, as in magnetic memories, switches, stepping registers and counters, it is desirable to provide magnetic cores having a substantially rectangular hysteresis loop, a high saturation flux density, and a tailored coercive force. For devices useful as microwave magnetic resonators, as in nonreciprocal attenuators, parametric amplifiers, rotators, phase shifters, switches, and filters, it is desirable to provide magnetic cores having a substantially rectangular magnetic hysteresis loop, a tailored resonance frequency and a high resistivity. The foregoing applications are discussed in more detail in the Proceedings of the IRE, vol. 44, No. 10, October 1956, pages 1240 to 1246.

An object of this invention is to provide improved magnetic cores, particularly useful for their rectangular magnetic hysteresis properties and for their magnetic resonance properties.

Another object is to provide improved methods for preparing the improved magnetic bodies herein.

The improved magnetic cores herein each comprise a ceramic of sintered particles, said particles consisting essentially of a mixed ferrospinel having the molar composition:

$$Li_xFe_{(2+x)(1-y-z)}Mn_{1-2x+(2+x)y}Al_{(2+x)z}O_4$$

where:
$x$=0.002 to 0.50
$y$=0.005 to 0.20
$z$=0.00 to 0.50

The foregoing formula represents a limited range of compositions within the four component system $$Li_2O—Fe_2O_3—Mn_2O_3—Al_2O_3$$

The crystallites of the magnetic cores herein all exhibit a spinel structure and have the formula $M^{2+}(M^{3+})_2O_4$ wherein $M^{2+}$ may be at least two of $(Li_{0.5}Fe_{0.5})^{2+}$, $(Li_{0.5}Mn_{0.5})^{2+}$, $(Li_{0.5}Al_{0.5})^{2+}$, $Mn^{2+}$ and $Fe^{2+}$, and $M^{3+}$ may be at least two of $Fe^{3+}$, $Mn^{3+}$ and $Al^{3+}$.

Many of the cores or bodies herein have a magnetic anisotropy at or near zero. Such characteristic imparts to the core a magnetic hysteresis loop with a sharp knee and a high squareness ratio. This also permits tailoring the coercive force by compositional adjustment.

Many of the cores or bodies herein have a wide range of magnetic moment, $M_s$, including values at or near zero. This permits tailoring the resonance frequency by compositional adjustments.

The invention includes also improved methods for manufacturing the magnetic bodies or cores herein. Where the compositional parameter $x$ is at or near 0.5, the processes herein preferably comprise sintering in an oxidizing atmosphere a shaped body of a calcined mixture including oxides of lithium, manganese, iron, and optionally aluminum, in the desired molar proportions and then annealing the sintered body in oxygen at an elevated temperature. Where the compositional parameter $x$ is substantially less than 0.5, the foregoing preferred processes are modified by adjusting the firing and annealing atmosphere to a more reducing condition to provide the desired proportion of divalent and trivalent cations. Such adjustment in firing produces divalent manganese ($M^{2+}$) and/or divalent iron ($Fe^{2+}$) in sufficient proportion to produce a mixed ferrospinel.

Figure 4:
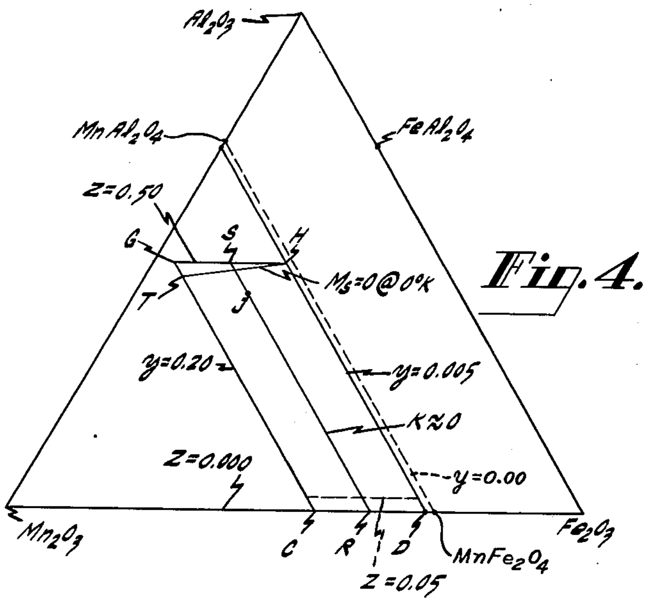
Figure 5A:
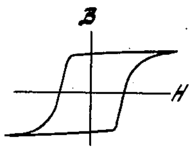
Figure 5B:
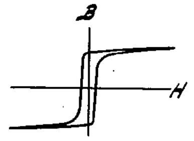
Figure 6:
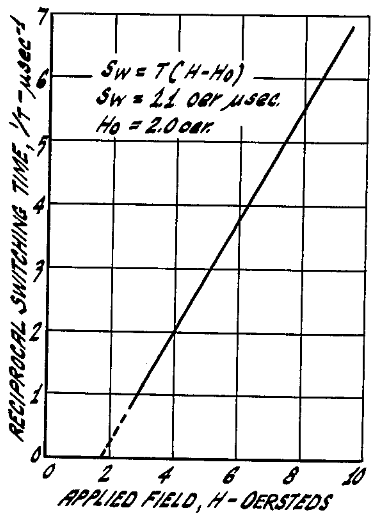
Figure 7:
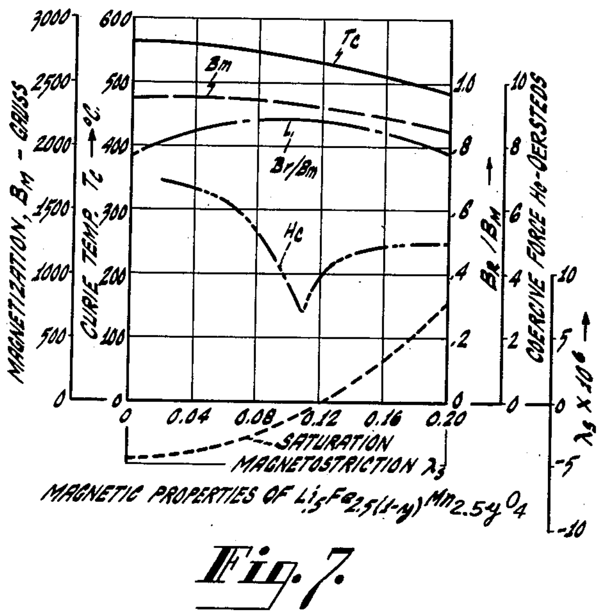
Figure 8:
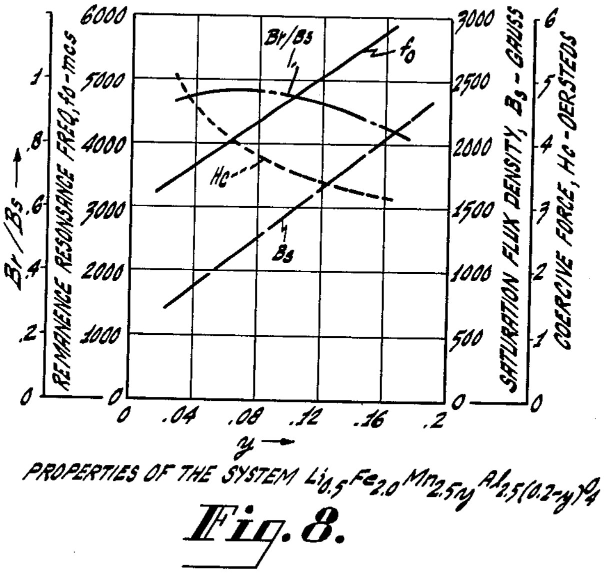
Figure 10:
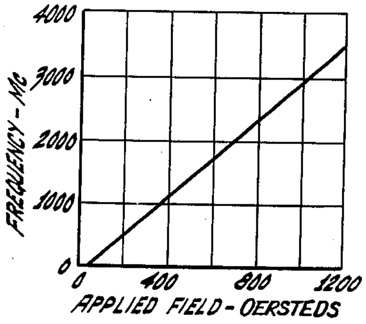
Figure 9:
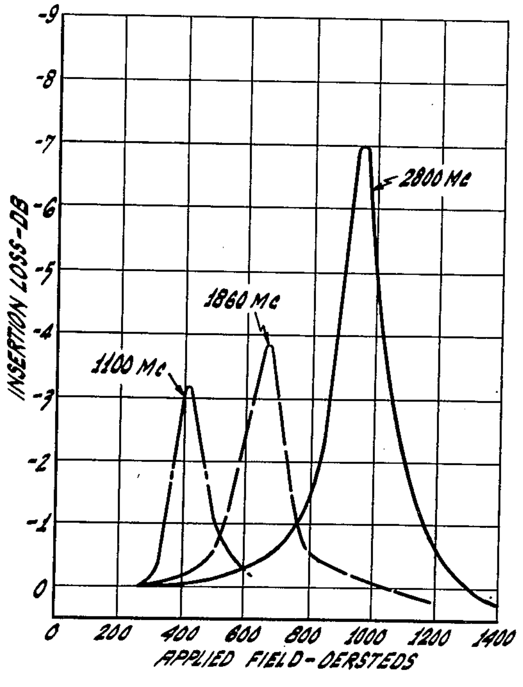
Figure 11:
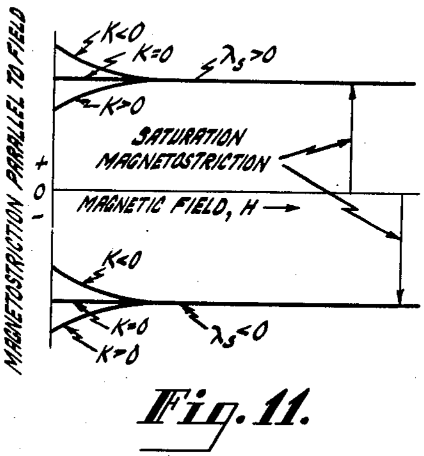

The invention is described in greater detail by reference to the accompanying drawings in which:

FIGURE 1 is a graphical representation of the four component system $Li_2O—Fe_2O_3—Mn_2O_3—Al_2O_3$ identifying the mixed ferrospinels of the invention herein, FIGURE 2 is a view of the plane $Li_2O—Fe_2O_3—Mn_2O_3$ of the graphical representation of FIGURE 1 identifying the mixed ferrospinels of the invention, FIGURE 3 is a view of the plane $$Li_{0.5}Fe_{2.5}O_4—Li_{0.5}Mn_{2.5}O_4—Li_{0.5}Al_{2.5}O_4$$

of the graphical representation of FIGURE 1 identifying the mixed ferrospinels of the invention, FIGURE 4 is a view of the plane $$Fe_2O_3—Mn_2O_3—Al_2O_3$$

of the graphical representation of FIGURE 1 identifying the mixed ferrospinels of the invention, FIGURES 5*a* and 5*b* are magnetic hysteresis loops for the composition represented by the point L of FIGURE 3, FIGURE 6 is a curve indicating the relationship between the reciprocal of the switching time and the magnitude of the applied field of the composition represented by the point L of FIGURE 3, FIGURE 7 is a family of curves indicating the Curie temperature ($T_c$), the magnetization ($B_m$), the discrimination ($B_r/B_m$), the coercive force ($H_c$), and the saturation magnetostriction ($\lambda_s$) for the compositions $$Li_{0.5}Fe_{2.5(1-y)}Mn_{2.5y}O_4$$

where $y$ is varied between 0.0 and 0.2,

FIGURE 8 is a family of curves indicating the remanence resonance frequency ($f_0$), the discrimination ($B_r/B_s$), the saturation flux density ($B_s$), and the coercive force ($H_c$) for the compositions $$Li_{0.5}Fe_{2.0}Mn_{2.5y}Al_{2.5(0.2-y)}O_4$$

where $y$ varies between 0.0 and 0.2,

FIGURE 9 is a family of remanence resonance loss curves for the composition represented by the point J of FIGURE 4, FIGURE 10 is a curve showing the relationship between applied field and resonance frequency for the composition represented by the point J of FIGURE 4, and FIGURE 11 are curves illustrating the influence of magnetic anisotropy on typical magnetostriction curves for polycrystals where $\lambda_{111}>\lambda_{100}$.

Similar reference characters are applied to similar elements throughout the drawings.

Referring to FIGURES 1, 2, 3 and 4, the improved magnetic cores herein each comprise a ceramic of sintered particles said particles consisting essentially of a mixed ferrospinel represented by the molar formula:

$$Li_xFe_{(2+x)(1-y-z)}Mn_{(1-2x)+(2+x)y}Al_{(2+x)z}O_4$$

where:

$x$=0.002 to 0.50
$y$=0.005 to 0.20
$z$=0.00 to 0.50

This is shown as the solid parallelepiped

A—B—C—D—H—E—F—G—A within the equilateral pyramid for the system $Li_2O—Fe_2O_3—Mn_2O_3—Al_2O_3$ Within this parallelepiped is shown a surface

L—P—M—S—R—L which represents the approximate locus of ferrospinel compositions having a zero magnetic anisotropy (K.). There is also shown a second surface

N—P—O—T—H—N which represents the approximate locus of the center of ferrospinel compositions having a zero magnetic moment ($M_s$) at 0° K.

Cores which are designed for information storage and handling devices should have a magnetic hysteresis loop with maximum rectangularity, maximum magnetic moment and a tailored coercive force. The optimum compositions with maximum rectangularity have been found to be those having a magnetic anisotropy at or near zero. For example, in the particular case of magnetic memory devices, it is desirable to provide cores that are magnetically saturated by a magnetizing pulse of unit magnitude but are substantially unaffected by a series of opposing magnetizing pulses of one half unit magnitude.

Cores which are designed for use in microwave resonance devices should also have a magnetic hysteresis loop with maximum rectangularity and a tailored resonance frequency. The resonance frequency is determined as follows:

$$f_0=\gamma(H_a+H_i)$$

where $f_0$=the resonance frequency, $\gamma$ is a constant whose value is about 2.8 oer. mc., $H_a$ is the applied magnetic field and $H_i$ is the internal magnetic field. Since $H_a$ may be varied very widely within the device, the lowest resonance frequency is determined by the magnitude of the value of $H_i$. The lower the value of $H_i$ the lower the frequency attainable.

The internal magnetic field $H_i$ is determined as follows:

$$H_i=4\pi M_s+\frac{|K|}{2M_s}$$

where $M_s$ is the magnetic moment and K is the anisotropy constant. The lowest values for $H_i$ are obtained where K is at a minimum and $M_s$ is low but not zero, there being an optimum value of $M_s$ for the lowest value of $H_i$.

With a knowledge of the locus of the center of ferrospinel compositions with a zero or near zero anisotropy and a zero or near zero magnetic moment at 0° K., one may select a composition tailored for a particular information or microwave application. Magnetic cores herein which have a high value of $x$ have a high Curie temperature. This permits a higher tolerance to the detrimental influence of losses and permits reliable operation over a large temperature range.

By way of illustration, a group of mixed ferrospinels herein, lie along the line A—B in FIGURES 1, 2 and 3 and are represented by the molar formula:

$$Li_{0.5}Fe_{2.5(1-y)}Mn_{2.5y}O_4$$

where $y$=0.005 to 0.20. This formula describes a limited range of solid solutions of $Li_{0.5}Fe_{2.5}O_4$ and $Li_{0.5}Mn_{2.5}O_4$. These compositions exhibit substantially rectangular magnetic hysteresis loops useful in magnetic memory devices. Optimum properties for this application are obtained with the composition $Li_{0.5}Fe_{2.23}Mn_{0.27}O_4$ designated point L where the magnetic anisotropy is believed to be about zero at room temperature. Departure from point L toward point A or point B yields compositions having increasingly negative or positive anisotropy constants respectively.

The composition of the first group of mixed ferrospinels herein may be varied by substituting trivalent aluminum ($Al^{3+}$) for up to one half of the trivalent iron ($Fe^{3+}$). The foregoing substitution yields a group of mixed ferrospinels represented by the area

A—B—F—E—A in FIGURES 1 and 3 and by the molar formula:

$$Li_{.5}Fe_{2.5(1-y-z)}Mn_{2.5y}Al_{2.5}O_4$$

where:

$y$=0.005 to 0.20
$z$=0.00 to 0.50

Referring to FIGURE 3, the line L—P—M represents the approximate locus of the center of compositions having a zero anisotropy. Ferrospinels useful in magnetic switching and microwave applications are found close to this line L—P—M. Departure from line L—P—M toward line A—N—E or line B—O—F yields compositions having increasingly negative or positive anisotropy constants respectively. The line N—P—O indicates the approximate location of composition of the center of ferrospinels having a zero magnetic moment at 0° K. The magnetic resonance frequency at remanence passes from about 6000 mc. at point L to about 400 mc. as the composition approaches point P.

The compositions of the first group of mixed ferrospinels may also be varied by progressively replacing $(Li_{.5}Fe_{.5})^{2+}$ by $Mn^{2+}$. A reduction in the proportion of lithium and iron yields a group of mixed ferrospinels useful for both magnetic memory, magnetic switching and microwave applications. These mixed ferrospinels are represented by the area A—B—C—D—A in FIGURES 1 and 2 and by the molar formula:

$$Li_xFe_{(2+x)(1-y)}Mn_{(1-2x)+(2+x)y}O_4$$

where:

$x$=0.002 to 0.50
$y$=0.005 to 0.20

The line LR represents the approximate center of compositions exhibiting a zero anisotropy at 0° K. Departure from line L—R toward line A—D or line B—C yields compositions having increasingly negative or positive anisotropy constants respectively.

The first group of mixed ferrospinels herein may also be modified by both a reduction in the proportion of lithium and by the substitution of trivalent aluminum for trivalent iron. One group of compositions is represented in FIGURE 4 which is the base plane of the equilateral pyramid of FIGURE 1. The ferrospinels herein are represented by the area C—G—H—D—C. The line R—S represents the approximate center of ferrospinels exhibiting a zero anisotropy at 0° K. The line H—T represents the approximate center of ferrospinels exhibiting a zero magnetic moment at 0° K.

The mixed ferrospinels of the invention may be prepared by methods commonly used in preparing ferrospinel compositions generally. The process steps for making all of the mixed ferrospinels herein are substantially the same except as subsequently noted. Raw metallic oxides or their equivalents are mixed together and pulverized by wet milling in a ball mill for an hour or more. An equivalent of a raw metal oxide is any compound which decomposes at temperatures that yield the desired oxides by the chemical reactions which occur during sintering. For example, it is sometimes more convenient to use metallic hydroxides, carbonates, or bicarbonates such as lithium carbonate, ferric hydroxide, aluminum hydrate or manganese carbonate because they may be more readily commercially available and because they may be relatively easier to handle. Sometimes it is advantageous to use metallic salts of organic acids such as manganese acetate or ferric formate. It is also desirable in some situations to produce the raw batch by coprecipitation from aqueous solutions, such as in the form of hydroxides.

The raw batch is dried and calcined at a temperature between 800 and 1050° C. for a period greater than 15 minutes. The purpose of calcining is to remove as much of the volatile matter contained in the raw batch as possible and to initiate the chemical reactions between the constituents of the raw batch.

After calcining, the calcined product is milled to reduce its particle size and to insure intimate mixing of the constituents. An organic binder such as paraffin or a resin and a lubricant, such as stearic acid, are added to the calcine toward the end of the milling to facilitate molding. The particular binder and a particular lubricant and the proportions thereof which are used are not critical. About two percent by weight of a fifty percent water suspension of paraffin may be used as a binder and about one percent by weight of stearic acid may be used as a mold lubricant. The weight percent given is based on the total weight of the mixture.

The milled calcine is shaped into cores by any convenient method such as by pressing in a die. The cores may be of any desired shape. The shapes currently used commercially for memory devices are toroids and multi-aperture plates. The molding pressure is not critical although there is an optimum pressure for each particular formulation and core shape.

The shaped calcine is slowly heated to burn off the binder and mold lubricant and is then sintered for a period of 15 minutes to 10 hours at a temperature between 900° and 1300° C. The sintering temperature is not critical except that it is preferred to attain the maximum density in the cores so as to obtain the optimum magnetic properties therefrom. The higher the sintering temperature the shorter should be the sintering time. After firing, the bodies are cooled slowly. By slow cooling is meant an average rate of cooling not in excess of 5° C. per minute.

The atmosphere during sintering is determined by the composition of the body being fired. Where the compositional parameter $x$ for the sintered composition is to be about 0.5 the sintering atmosphere should be oxidizing so that all of the manganese and iron is converted to the trivalent state. During firing the chemical reactions are substantially completed forming a ceramic of sintered particles, said particles consisting essentially of a mixed spinel herein. Following sintering, these bodies are annealed at about 1000° C. for an extended period of time in oxygen. Temperatures between 900 and 1050° C. for periods of 10 to 100 hours are satisfactory. The purpose of annealing the bodies in oxygen is to bring the mixed ferrospinel composition to its maximum oxidation state, particularly that of the manganese and the iron, consistent with producing a spinel crystal structure.

Where the compositional parameter $x$ for the fired composition is less than 0.5, a portion of the manganese and/or iron is converted to the divalent state to produce a spinel structure. This may be accomplished by sintering in a suitably reducing atmosphere such as one containing an additional proportion of nitrogen or carbon monoxide. Or the bodies may be sintered in air and then annealed in a suitably reducing atmosphere such as nitrogen or a mixture of air and carbon monoxide.

The table sets forth selected ferrospinels of the invention indicating the molar composition of the spinel and various of the magnetic properties thereof.

For purposes of comparing the magnetic properties of the mixed ferrospinels of the invention, test toroids of the various compositions are prepared having an outside diameter of about 0.5 centimeter and a height of about 0.2 centimeter. The toroids are wound with a primary input winding of 5 turns and a secondary output winding of 25 turns, each of AWG No. 30 copper wire.

A 60 cycle alternating current is passed through the primary winding and the integral of the current induced in the secondary winding is observed on the display of a 60 cycle B—H loop tracer. The maximum flux density $B_m$, the remanent flux density $B_r$, and the coercive force $H_c$ are obtained on the same saturation B—H loop (maximum magnetic field was about 50 oersteds). The value $B_r/B_s$ is a qualitative measure of the degree of rectangularity of the toroid. Where the value of $B_r/B_s$ is greater than 0.80, the ferrite is considered to be substantially rectangular.

The Curie temperature data is obtained on test sticks (about 0.15″ x 0.15″ x 1.50″) of the particular composition (prepared together with test toroids) by obtaining a plot of initial permeability versus temperature and noting the temperature at which the function of permeability changed discontinuously to unity.

The domain magnetic anisotropy is determined as to order of magnitude and sign on test discs (also prepared together with test toroids) by means of magnetostriction measurements. The magnetostriction is obtained as a function of applied field up to 10,000 oersteds using a standard strain gauge technique. A theory to explain this follows. A negative anisotropy may be considered to be the preference of a spinel crystal to be magnetized in a direction diagonally, from corner to corner, in the cubic unit cell of the crystal. A positive anisotropy may be considered to be the preference of a spinel crystal to be magnetized in a direction parallel to crystal edges of the cubic unit cell. A zero anisotropy may be considered to be that condition where the spinel crystal exhibits no preferred magnetization direction.

In a polycrystalline body, the crystallites thereof are randomly oriented. Most crystallites are oriented so that the preferred directions are different from the direction in which magnetization is desired. Thus, the magnetizing field must overcome the preferred directions of most crystallites to a greater or less degree. Further, when the magnetizing field is removed, the magnetizations of many crystallites relax, i.e., attempt to revert to the nearest preferred magnetization direction. The relaxation of the crystallite magnetizations influences the B—H loop shape via two different mechanisms, domain rotations and domain-wall motions. Considering domain rotations alone, the remanent magnetization would be reduced and the dispersion in fields required for complete reversal would yield a very non-rectangular B—H loop. Considering domain-wall motion only, the dispersion in local magnetization would produce local demagnetizing fields and also a dispersion in domain-wall orientations with respect to the applied field, both of which would tend to produce a low remanent magnetization and a non-rectangular B—H loop. Therefore, regardless which, domain rotation or domain-wall motion, plays the major role a non-zero anisotropy for conventional polycrystalline materials tends to produce a non-rectangular B—H loop.

When the domain anisotropy is zero the crystallites have no preferred magnetization direction. The magnetization of each crystallite will remain in the direction of the saturating field and there will be no domain rotation. Hence, on the basis of domain rotation only, one would expect a high remanent magnetization and a sharp knee in the B—H loop as the total moment is rotated at some critical field. Considering domain-wall motion only, there would be no local demagnetizing fields and all domain walls would be similarly oriented with respect to the applied field; hence, one would also predict a high remanent magnetization and a sharp knee in the B—H loop as the applied field reaches the threshold field for domain wall motion which would now be the same for all domain walls.

The sign of the domain anisotropy is indicated by the sign of the change in magnetostriction parallel to the applied field as the field is reduced from saturating field strengths toward zero. The influence of magnetic anisotropy on typical magnetostriction data is illustrated in FIGURE 11 for both negative and positive saturation magnetostriction. If the magnetostriction becomes more positive, the domain anisotropy is negative; if the magnetostriction becomes more negative the anisotropy is positive; and finally if the magnetostriction does not change as the total effective field is reduced to zero the domain anisotropy is zero.

EXAMPLE 1

An intimate mixture is prepared of 3.7 grams of $Li_2CO_3$, 35.6 grams of $Fe_2O_3$, and 4.12 grams of $Mn_3O_4$. The intimate mixture, or raw batch, is ball milled for about 8 hours and then calcined at 1000° C. for about 1 hour in air. The calcine is ball milled for about 8 hours to provide a fine particle size and an intimate physical mixture and then mixed with about 1% by weight of a binder, for example, Trigamine oleate and about 1% of a mold lubricant such as a paraffin emulsion. The ball milled mixture with the binder is pressed at a pressure of about 8000 pounds per square inch to a toroid having the approximate dimensions 0.5 cm. O.D. x 0.25 cm. I.D. x 0.2 cm. thick. The toroid is sintered at about 1100° C. for about 1 hour in air and slowly cooled to room temperature. The toroid is then annealed at about 1000° C. for about 63 hours in an atmosphere of oxygen.

Referring to FIGURE 5, the toroid of Example 1 exhibits a substantially rectangular magnetic hysteresis loop. The curves of FIGURE *5a* and *5b* are traces taken from the oscilloscope display of a 60 cycle B—H loop tracer. With a maximum field of 5.6 oersteds, the toroid exhibits a flux density of about 1900 gausses. With a maximum field of 35 oersteds the toroid exhibits a flux density of about 2000 gausses.

The substantially rectangular magnetic hysteresis characteristic of the mixed ferrite core of Example 1 is especially useful for information storage and handling. Since there are two stable states of remanent magnetization on the hysteresis loop, the toroid may be used to store digital information by being placed in one or the other stable states and then detecting its condition.

Referring to FIGURE 6 the toroid of Example 1 may be switched from one stable state to the other in as little as 1 microsecond or less. The reciprocal of the switching time is a function of the applied field. The greater the applied field the shorter the switching time.

The molar composition of the toroid of Example 1 is approximately:

$$Li_{0.5}Fe_{2.23}Mn_{0.27}O_4$$

The molar proportion of iron ($Fe^{3+}$) in the foregoing mixed ferrite may be varied from 2.20 to 2.49 so long as the molar proportion of trivalent manganese ($Mn^{3+}$) is adjusted to maintain the proportion of trivalent iron plus trivalent manganese at 2.50.

The effect of substituting manganese for iron in $Li_{0.5}Fe_{2.5}O_4$ is illustrated in FIGURE 7.

It will be noted that increasing proportions of manganese results in a decreasing Curie temperature and an increasingly positive saturation magnetostriction. The value of $B_rB_s$ which is a qualitative measure of rectangularity increases to a peak and falls off while the coercive force decreases to a low and then rises again. Such decrease in coercive force with a corresponding increase in rectangularity produces mixed ferrite toroids for memory devices and switching which are operable with lower drive currents.

EXAMPLE 2

Follow the procedure of Example 1 except substitute the following raw batch:

| | Grams |
|---|---|
| $Li_2CO_3$ | 3.69 |
| $Fe_2O_3$ | 100.4 |
| $Mn_3O_4$ | 50.9 |

The magnetic cores prepared according to Example 2 have the molar formula: $Li_{0.15}Fe_{1.88}Mn_{0.97}O_4$ and exhibits a substantially rectangular hysteresis loop. Calcine at 1050° C. in air 1 hour, sinter at 1180° C. in nitrogen for 2 hours.

EXAMPLE 3

Follow the procedure of Example 1 except substitute the following raw batch:

| | Grams |
|---|---|
| $LiCO_3$ | 39.14 |
| $Al_2O_3$ | 31.31 |
| $Fe_2O_3$ | 160.11 |
| $Mn_3O_4$ | 7.89 |

The mixed ferrite core prepared according to Example 3 has the molar formula $Li_{0.5}Fe_2Mn_{0.10}Al_{0.40}O_4$ and exhibits a substantially rectangular magnetic hysteresis loop.

EXAMPLE 4

Follow the procedure of Example 1 except substitute the following raw batch:

| | Grams |
|---|---|
| $Al_2O_3$ | 8.1 |
| $Fe_2O_3$ | 15.9 |
| $Mn_3O_4$ | 18.3 |

Calcine at about 1100° C. for about one hour in nitrogen and fire the shaped calcine at about 1350° C. for about one hour in an atmosphere of nitrogen. The magnetic cores of Example 4 have the composition of point J of FIGURES 1 and 4.

The foregoing description is with respect to magnetic cores in a range of compositions which may be useful for magnetic information storage and handling devices, microwave resonance devices or both. It has been found that magnetic cores herein which are particularly useful for magnetic information storage and handling devices fall in the compositional range:

$$Li_xFe_{(2+x)(1-y-z)}Mn_{(1-2x)+(2+x)y}Al_{(2+x)z}O_4$$

where:

$x$=0.05 to 0.50
$y$=0.005 to 0.20
$z$=0.00 to 0.33

It has also been found that magnetic cores which are particularly useful for microwave resonance devices fall in the compositional range:

$$Li_xFe_{(2+x)(1-y-z)}Mn_{(1-2x)+(2+x)y}Al_{(2+x)z}O_4$$

where:

$$x=0.002 \text{ to } 0.50$$
$$y=0.005 \text{ to } 0.20$$
$$z=0.05 \text{ to } 0.50$$

*Table*

| No. | X | Y | Z | Mol Fraction | | | | $B_s$-H, gauss | Coercive force, oer. | $B_r/B_s$ | Curie Temper- ° K. |
|---|---|---|---|---|---|---|---|---|---|---|---|
| | | | | $Li_2O$ | $Fe_2O_3$ | $Mn_2O_3$ | $Al_2O_3$ | | | | |
| 1 | 0.500 | 0 | 0 | 0.1667 | 0.8333 | 0 | 0 | 2,410 | 3.3 | 0.8 | 840 |
| 2 | 0.500 | 0.040 | 0 | 0.1667 | 0.8000 | 0.0333 | 0 | 2,300 | 6.8 | 0.83 | 835 |
| 3 | 0.500 | 0.080 | 0 | 0.1667 | 0.7667 | 0.0666 | 0 | 1,900 | 5.2 | 0.87 | 823 |
| 4 [1] | 0.500 | 0.108 | 0 | 0.1667 | 0.7433 | 0.0900 | 0 | 2,000 | 2.8 | 0.87 | 813 |
| 5 | 0.500 | 0.120 | 0 | 0.1667 | 0.7333 | 0.1000 | 0 | 2,500 | 4.4 | 0.86 | 806 |
| 6 | 0.500 | 0.160 | 0 | 0.1667 | 0.7000 | 0.1333 | 0 | 2,400 | 4.8 | 0.84 | 783 |
| 7 | 0.500 | 0.200 | 0 | 0.1667 | 0.6667 | 0.1666 | 0 | 2,080 | 5.0 | 0.79 | 753 |
| 8 | 0.500 | 0.300 | 0 | 0.1667 | 0.5833 | 0.2500 | 0 | 1,910 | 3.2 | 0.75 | 663 |
| 9 | 0.500 | 0.400 | 0 | 0.1667 | 0.5000 | 0.3333 | 0 | 1,700 | 2.7 | 0.75 | 538 |
| 10 | 0.500 | 0.500 | 0 | 0.1667 | 0.4167 | 0.4166 | 0 | 1,540 | 1.2 | 0.75 | 503 |
| 11 | 0.500 | 0.600 | 0 | 0.1667 | 0.3333 | 0.5000 | 0 | 955 | 1.1 | 0.75 | 441 |
| 12 | 0.500 | 0.700 | 0 | 0.1667 | 0.2500 | 0.5833 | 0 | -------- | -------- | -------- | 363 |
| 13 | 0.192 | 0.209 | 0 | 0.0640 | 0.5780 | 0.3580 | 0 | 2,500 | 212 | 0.90 | 568 |
| 14 | 0.150 | 0.1255 | 0 | 0.0500 | 0.6270 | 0.3230 | 0 | 2,200 | 1.6 | 0.87 | 561 |
| 15 | 0.075 | 0.130 | 0 | 0.0250 | 0.6020 | 0.3730 | 0 | 2,990 | 2.1 | 0.89 | 539 |
| 16 | 0.500 | 0 | 0.200 | 0.1667 | 0.6667 | 0 | 0.1666 | -------- | -------- | -------- | 666 |
| 17 | 0.500 | 0.040 | 0.160 | 0.1667 | 0.6667 | 0.0333 | 0.1333 | 903 | 417 | 0.96 | 699 |
| 18 | 0.500 | 0.120 | 0.080 | 0.1667 | 0.6667 | 0.1000 | 0.0666 | 1,613 | 3.3 | 0.93 | 711 |
| 19 | 0.500 | 0.160 | 0.040 | 0.1667 | 0.6667 | 0.1333 | 0.0333 | 2,090 | 3.2 | 0.87 | 746 |
| 20 | 0 | 0 | 0.500 | 0 | 0.3334 | 0.3333 | 0.3333 | 28 | -------- | -------- | 350 |
| 21 | 0 | 0.025 | 0.475 | 0 | 0.3334 | 0.3500 | 0.3166 | 28 | -------- | -------- | 355 |
| 22 | 0 | 0.050 | 0.450 | 0 | 0.3334 | 0.3666 | 0.3000 | 35 | -------- | -------- | 360 |
| 23 [2] | 0 | 0.100 | 0.400 | 0 | 0.3334 | 0.4000 | 0.2666 | 41 | -------- | -------- | 360 |
| 24 | 0 | 0.125 | 0.375 | 0 | 0.3334 | 0.4166 | 0.2500 | -------- | -------- | -------- | 370 |
| 25 | 0 | 0.150 | 0.350 | 0 | 0.3334 | 0.4333 | 0.2333 | -------- | -------- | -------- | 370 |

[1] This sample corresponds to point L in Figures 1, 2, 3, 5, and 6.
[2] This sample corresponds to point J in Figures 1, 4, 9, and 10.

What is claimed is:

1. A magnetic core having a ratio of $B_r/B_s$ of at least 0.75 comprising a ceramic of sintered particles, said particles consisting essentially of a mixed spinel having the molar composition:

$$Li_xFe_{(2+x)(1-y-z)}Mn_{(1-2x)+(2+x)y}Al_{(2+x)z}O_4$$

where:

$$x=0.002 \text{ to } 0.05$$
$$y=0.005 \text{ to } 0.20$$
$$z=0.00 \text{ to } 0.50$$

and formed by heating a shaped mixture consisting essentially of compounds which yield said mixed spinel at temperatures between 900° C. and 1300° C. in an atmosphere which is oxidizing when $x$ is about 0.5 and reducing when $x$ is substantially less than 0.5.

2. A magnetic core having a ratio of $B_r/B_s$ of at least 0.75 comprising a ceramic of sintered particles, said particles consisting essentially of a mixed spinel having the molar composition:

$$Li_xFe_{(2+x)(1-y-z)}Mn_{(1-2x)+(2+x)y}Al_{(2+x)z}O_4$$

where:

$$x=0.05 \text{ to } 0.50$$
$$y=0.005 \text{ to } 0.20$$
$$z=0.00 \text{ to } 0.33$$

and formed by heating a shaped mixture consisting essentially of compounds which yield said mixed spinel at temperatures between 900° C. and 1300° C. in an atmosphere which is oxidizing when $x$ is about 0.5 and reducing when $x$ is substantially less than 0.5.

3. A magnetic core having a ratio of $B_r/B_s$ of at least 0.75 comprising a ceramic of sintered particles, said particles consisting essentially of a mixed spinel having the molar composition:

$$Li_xFe_{(2+x)(1-y-z)}Mn_{(1-2x)+(2+x)y}Al_{(2+x)z}O_4$$

where:

$$x=0.002 \text{ to } 0.50$$
$$y=0.005 \text{ to } 0.20$$
$$z=0.05 \text{ to } 0.50$$

and formed by heating a shaped mixture consisting essentially of compounds which yield said mixed spinel at temperatures between 900° C. and 1300° C. in an atmosphere which is oxidizing when $x$ is about 0.5 and reducing when $x$ is substantially less than 0.5.

4. A magnetic core having a ratio of $B_r/B_s$ of at least 0.75 comprising a ceramic of sintered particles, said particles consisting essentially of a mixed spinel having the molar composition:

$$Li_xFe_{(2+x)(1-y)}Mn_{(1-2x)+(2+x)y}O_4$$

where:

$$x=0.002 \text{ to } 0.50$$
$$y=0.005 \text{ to } 0.20$$

and formed by heating a shaped mixture consisting essentially of compounds which yield said mixed spinel at temperatures between 900° C. and 1300° C. in an atmosphere which is oxidizing when $x$ is about 0.5 and reducing when $x$ is substantially less than 0.5.

5. A magnetic core having a ratio of $B_r/B_s$ of at least 0.75 comprising a ceramic of sintered particles, said particles consisting essentially of a mixed spinel having the molar composition:

$$Li_{0.5}Fe_{2.5(1-y)}Mn_{2.5y}O_4$$

where:

$$y=0.005 \text{ to } 0.20$$

and formed by heating a shaped mixture consisting essentially of compounds which yield said mixed spinel at temperatures between 900° C. and 1300° C. in an oxidizing atmosphere.

6. A magnetic core having a ratio of $B_r/B_s$ of at least 0.75 comprising a ceramic of sintered particles, said particles consisting essentially of a mixed spinel having the molar composition:

$$Li_{0.5}Fe_{2.23}Mn_{0.27}O_4$$

and formed by heating a shaped mixture consisting essentially of compounds which yield said mixed spinel at temperatures between 900° C. and 1300° C. in an oxidizing atmosphere.

7. A magnetic core having a ratio of $B_r/B_s$ of at least 0.75 comprising a ceramic of sintered particles, said particles consisting essentially of a mixed spinel having the molar composition:

$$Li_{0.5}Fe_{2.5(1-y-z)}Mn_{2.5y}Al_{2.5z}O_4$$

where:

$$y=0.005 \text{ to } 0.20$$
$$z=0.00 \text{ to } 0.50$$

and formed by heating a shaped mixture consisting essentially of compounds which yield said mixed spinel at temperatures between 900° C. and 1300° C. in an oxidizing atmosphere.

8. A magnetic core having a ratio of $B_r/B_s$ of at least 0.75 comprising a ceramic of sintered particles, said particles consisting essentially of a mixed spinel having the molar composition:

$$Li_{0.5}Fe_{2.00}Mn_{2.5y}Al_{2.5(0.2-y)}O_4$$

where:

$$y=0.005 \text{ to } 0.20$$

and formed by heating a shaped mixture consisting essentially of compounds which yield said mixed spinel at temperatures between 900° C. and 1300° C. in an oxidizing atmosphere.

9. A magnetic core having a ratio of $B_r/B_s$ of at least 0.75 comprising a ceramic of sintered particles, said particles consisting essentially of a mixed spinel having the molar composition:

$$Li_{0.5}Fe_{2.00}Mn_{0.25}Al_{0.25}O_4$$

and formed by heating a shaped mixture consisting essentially of compounds which yield said mixed spinel at temperatures between 900° C. and 1300° C. in an oxidizing atmosphere.

10. A ferromagnetic ferrite body having a substantially rectangular hysteresis loop formed by firing a shaped mixture of iron oxide, manganese oxide, aluminum oxide and lithium oxide in proportions to produce essentially a sintered ceramic of spinel crystals having the molar composition:

$$Li_xFe_{(2+x)(1-y-z)}Mn_{(1-2x)+(2+x)y}Al_{(2+x)z}O_4$$

where:

$$x=0.002 \text{ to } 0.50$$
$$y=0.005 \text{ to } 0.20$$
$$z=0.00 \text{ to } 0.50$$

said firing being carried out for 15 minutes to 100 hours at temperatures between 900° C. and 1300° C. in an atmosphere which is oxidizing when $x$ is about 0.5 and reducing when $x$ is substantially less than 0.5.

11. The ferromagnetic body of claim 10 wherein said mixture of oxides is calcined.

12. A method comprising intimately mixing raw ingredients in proportions to provide the molar composition upon firing:

$$Li_xFe_{(2+x)(1-y-z)}Mn_{(1-2x)y}Al_{(2+x)z}O_4$$

where:

$$x=0.002 \text{ to } 0.50$$
$$y=0.005 \text{ to } 0.20$$
$$z=0.00 \text{ to } 0.50$$

calcining said raw batch at a temperature of between about 800° C. and 1050° C., forming the calcine to a predetermined shape, and sintering said shaped calcine at a temperature between about 900° C. and 1300° the atmosphere during sintering being oxidizing when $x$ is about 0.5 and reducing when $x$ is substantially less than 0.5.

13. The method of claim 12 including annealing the sintered shaped calcine at a temperature between about 900° C. and 1050° C.

References Cited in the file of this patent

UNITED STATES PATENTS

| | | |
|---|---|---|
| 2,549,089 | Hegyi | Apr. 17, 1951 |
| 2,565,861 | Leverenz et al. | Aug. 28, 1951 |
| 2,576,456 | Harvey et al. | Nov. 27, 1951 |
| 2,677,663 | Yonker et al. | May 4, 1954 |

FOREIGN PATENTS

| | | |
|---|---|---|
| 201,851 | Australia | Apr. 7, 1955 |
| 211,028 | Australia | Oct. 24, 1957 |
| 735,375 | Great Britain | Aug. 17, 1955 |
| 908,717 | France | Oct. 15, 1945 |
| 1,122,258 | France | May 22, 1956 |
| 1,151,437 | France | Aug. 19, 1957 |

OTHER REFERENCES

Gorter: Philips Research Reports, December 1954, pp. 419–443, pp. 420, 422, 423, 429, 432, 441.

Kordes et al.: Chem. Abs., vol. 46, col. 4411, May 25, 1952.

Gorter: Proceedings of the IRE, December 1955 p. 1960.

Snoek: Physica, June 1936, p. 470.

Economos: J. Amer. Ceramic Soc., November 1955, pp. 408, 409.

Bozorth et al.: Physical Reviews, September 15, 1955 p. 1792.

Economos: J. Amer. Ceramics Soc., July 1955, p. 242.

UNITED STATES PATENT OFFICE
CERTIFICATE OF CORRECTION

Patent No. 3,034,987 May 15, 1962

Philip K. Baltzer

It is hereby certified that error appears in the above numbered patent requiring correction and that the said Letters Patent should read as corrected below.

Column 2, line 22, for "$M^{2+}$" read -- $Mn^{2+}$ --; column 8, line 9, for "$B_rB_s$" read -- $B_r/B_s$ --; columns 9 and 10, in the table, under the heading "Coercive Force, oer." opposite No. 13, for "212" read -- 2.2 --; same column, opposite No. 17, for "417" read -- 4.7 --; column 9, line 43, for "0.05" read -- 0.50 --; column 12, line 26, for "Yonker" read -- Jonker --.

Signed and sealed this 6th day of November 1962.

(SEAL)
Attest:

ERNEST W. SWIDER
Attesting Officer

DAVID L. LADD
Commissioner of Patents